(12) United States Patent
Dandekar et al.

(10) Patent No.: US 7,226,121 B2
(45) Date of Patent: Jun. 5, 2007

(54) RAIL ASSEMBLY FOR VEHICLES

(75) Inventors: Bhushan W. Dandekar, Rochester Hills, MI (US); Dmitriy V. Mazur, West Bloomfield, MI (US); Matthew B. Rombach, Davisburg, MI (US)

(73) Assignee: General Motors Corporation, Detroit, MI (US)

( * ) Notice: Subject to any disclaimer, the term of this patent is extended or adjusted under 35 U.S.C. 154(b) by 29 days.

(21) Appl. No.: 10/913,966

(22) Filed: Aug. 6, 2004

(65) Prior Publication Data

US 2006/0028055 A1    Feb. 9, 2006

(51) Int. Cl.
*B60R 27/00* (2006.01)
(52) U.S. Cl. ................................. 296/204
(58) Field of Classification Search ........... 296/204, 296/203.01, 205, 203.02, 203.09, 209, 29, 296/30, 187.03, 187.08, 187.09, 187.1, 193.07, 296/193.09
See application file for complete search history.

(56) References Cited

U.S. PATENT DOCUMENTS

| | | | | |
|---|---|---|---|---|
| 5,125,715 A * | 6/1992 | Kijima | ................ | 296/187.09 |
| 5,184,868 A * | 2/1993 | Nishiyama | ........... | 296/187.09 |
| 6,361,102 B1 * | 3/2002 | Han | ..................... | 296/203.02 |
| 6,854,791 B1 * | 2/2005 | Jaggi | ................... | 296/203.01 |
| 6,908,132 B2 * | 6/2005 | Bauhof | .................... | 296/1.01 |
| 6,928,736 B2 * | 8/2005 | Czaplicki et al. | ......... | 29/897.2 |
| 6,929,314 B2 * | 8/2005 | Hanyu | .................. | 296/203.02 |
| 6,938,948 B1 * | 9/2005 | Cornell et al. | ........ | 296/187.09 |
| 2001/0020797 A1 * | 9/2001 | Saeki | ................... | 296/203.03 |

FOREIGN PATENT DOCUMENTS

JP        405131955 A  *  5/1993  ............. 296/209

* cited by examiner

*Primary Examiner*—H Gutman
(74) *Attorney, Agent, or Firm*—Lionel D. Anderson

(57) ABSTRACT

A rail assembly for a vehicle includes a rail member extending longitudinally. The rail assembly also includes an insert disposed within and extending longitudinally along at least a portion of the rail member and having at least one curved section to provide load carrying capacity in the rail member.

16 Claims, 4 Drawing Sheets

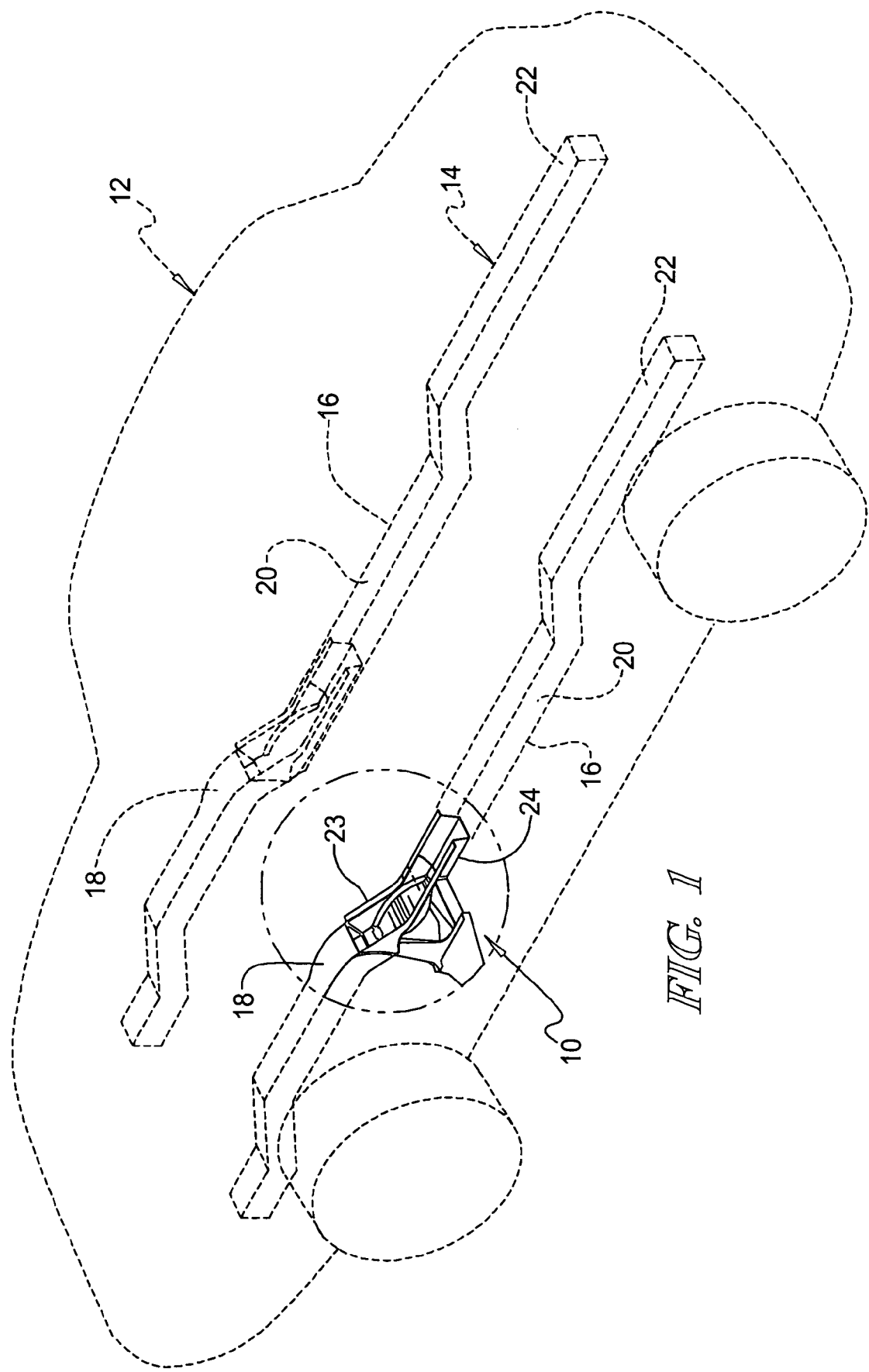

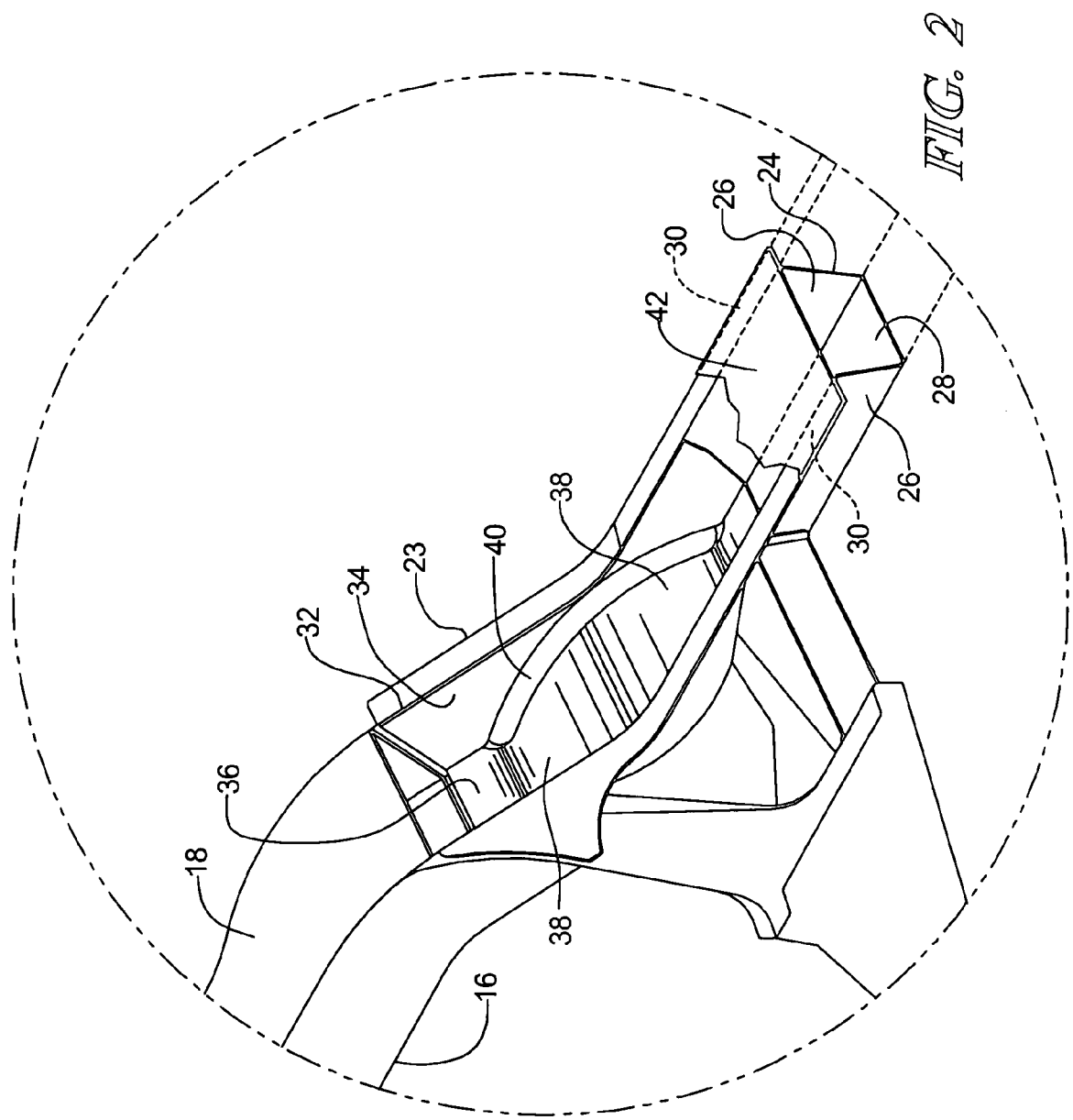

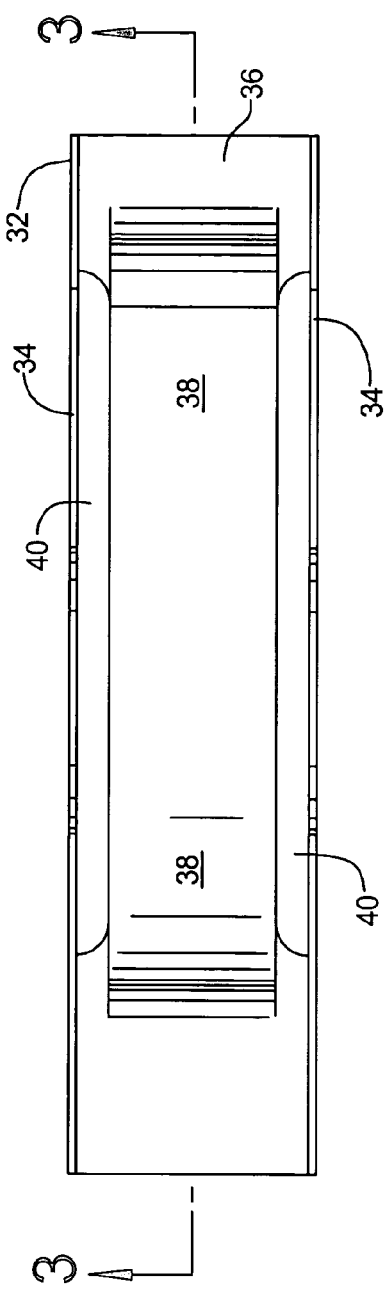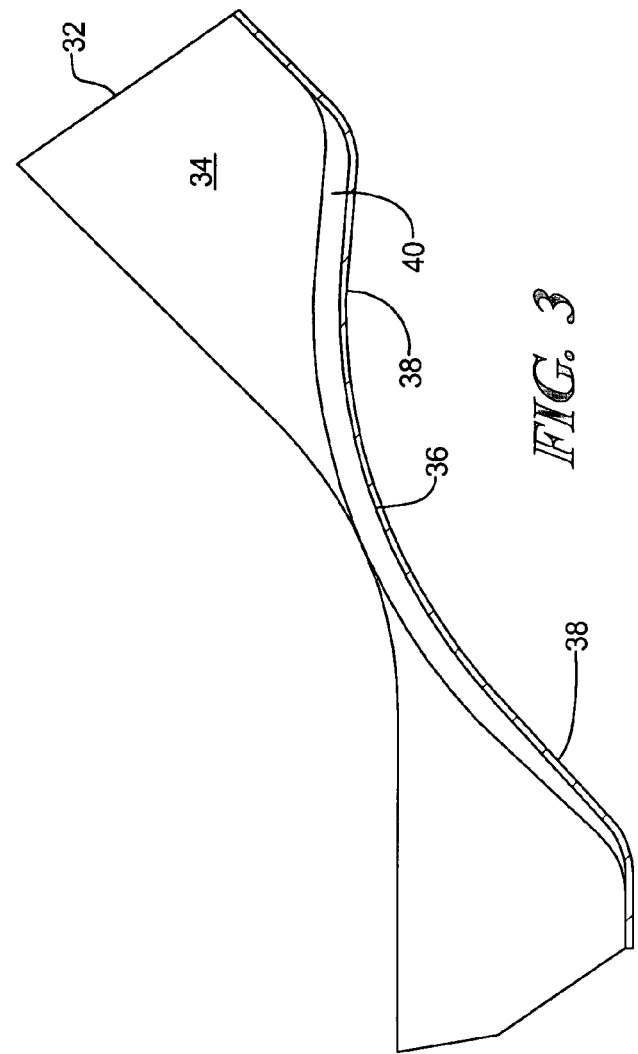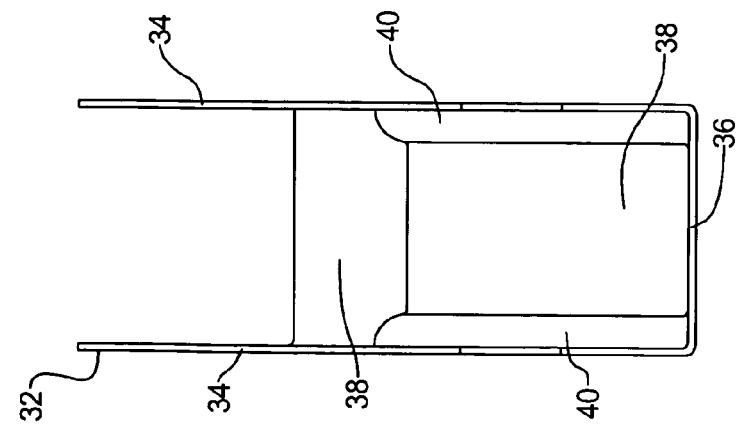

RAIL ASSEMBLY FOR VEHICLES

TECHNICAL FIELD

The present invention relates generally to vehicles and, more specifically, to a rail assembly for a vehicle.

BACKGROUND OF THE INVENTION

It is known to construct frames for vehicles such as automotive vehicles with longitudinal rails. Longitudinal rails in the kick-down area are typically open "C" sections. The open side is welded to the front of a dash panel. The longitudinal rail of the vehicle must provide adequate load carrying capacity in order to minimize dash and toe-pan intrusion in the event of a frontal impact. In order to reduce the deformation of the rail into the dash and the toe-pan, proper support is needed in the kick-down area of the longitudinal rail. The dash panel is typically welded to the longitudinal rail in the kick-down area, thus making it difficult to design a strong closed section able to resist moments about a lateral axis.

As a result, it is desirable to provide a new reinforcement for a longitudinal rail of a vehicle. It is also desirable to provide an internal reinforcement for a longitudinal rail of a vehicle. It is further desirable to provide an internal reinforcement for a longitudinal rail of a vehicle that is designed to provide load carrying capacity in the longitudinal rail. Therefore, there is a need in the art to provide a new reinforcement for a longitudinal rail of a vehicle that meets these desires.

SUMMARY OF THE INVENTION

It is, therefore, one object of the present invention to provide a new reinforcement for longitudinal rails of a vehicle.

It is another object of the present invention to provide a new reinforcement for a kick-down area of longitudinal rails of a vehicle.

To achieve the foregoing objects, the present invention is a rail assembly for a vehicle including a rail member extending longitudinally. The rail assembly also includes an insert disposed within and extending longitudinally along at least a portion of the rail member and having at least one curved section to provide load carrying capacity in said rail member.

One advantage of the present invention is that a rail assembly is provided for a vehicle that locally reinforces a rail member of a frame of the vehicle. Another advantage of the present invention is that the rail assembly incorporates an insert that is a curved shape-optimized beam to provide load carrying capacity in a longitudinal rail of a vehicle frame. Yet another advantage of the present invention is that the insert is an optimized design in terms of packaging and load capacity with the constraint that it cannot interfere with a front of a dash panel of a vehicle. Still another advantage of the present invention is that the insert is welded inside a longitudinal rail of a vehicle frame, enabling the maximum possible closed-box section without any discontinuities. A further advantage of the present invention is that the insert is located in a kick-down area of a longitudinal rail of a vehicle frame. Yet a further advantage of the present invention is that the insert is a curved beam that is geometrically optimized, yielding mass and cost savings compared to other such reinforcements. Still a further advantage of the present invention is that the insert helps stabilize a kick-down area of a longitudinal rail and reduces toe-pan and dash panel intrusion during a frontal impact. A further advantage of the present invention is that the insert can be used in all vehicles with unibody construction.

Other objects, features, and advantages of the present invention will be readily appreciated, as the same becomes better understood, after reading the subsequent description taken in conjunction with the accompanying drawings.

BRIEF DESCRIPTION OF THE DRAWINGS

FIG. 1 is a perspective view of a rail assembly, according to the present invention, illustrated in operational relationship with a vehicle.

FIG. 2 is an enlarged perspective view of a portion of the rail assembly in circle 2 of FIG. 1.

FIG. 3 is a front elevational view of an insert, according to the present invention, of the rail assembly of FIG. 2.

FIG. 4 is a plan view of the insert of the rail assembly of FIG. 2.

FIG. 5 is a side elevational view of the insert of the rail assembly of FIG. 2.

DESCRIPTION OF THE PREFERRED EMBODIMENT

Figure 6:
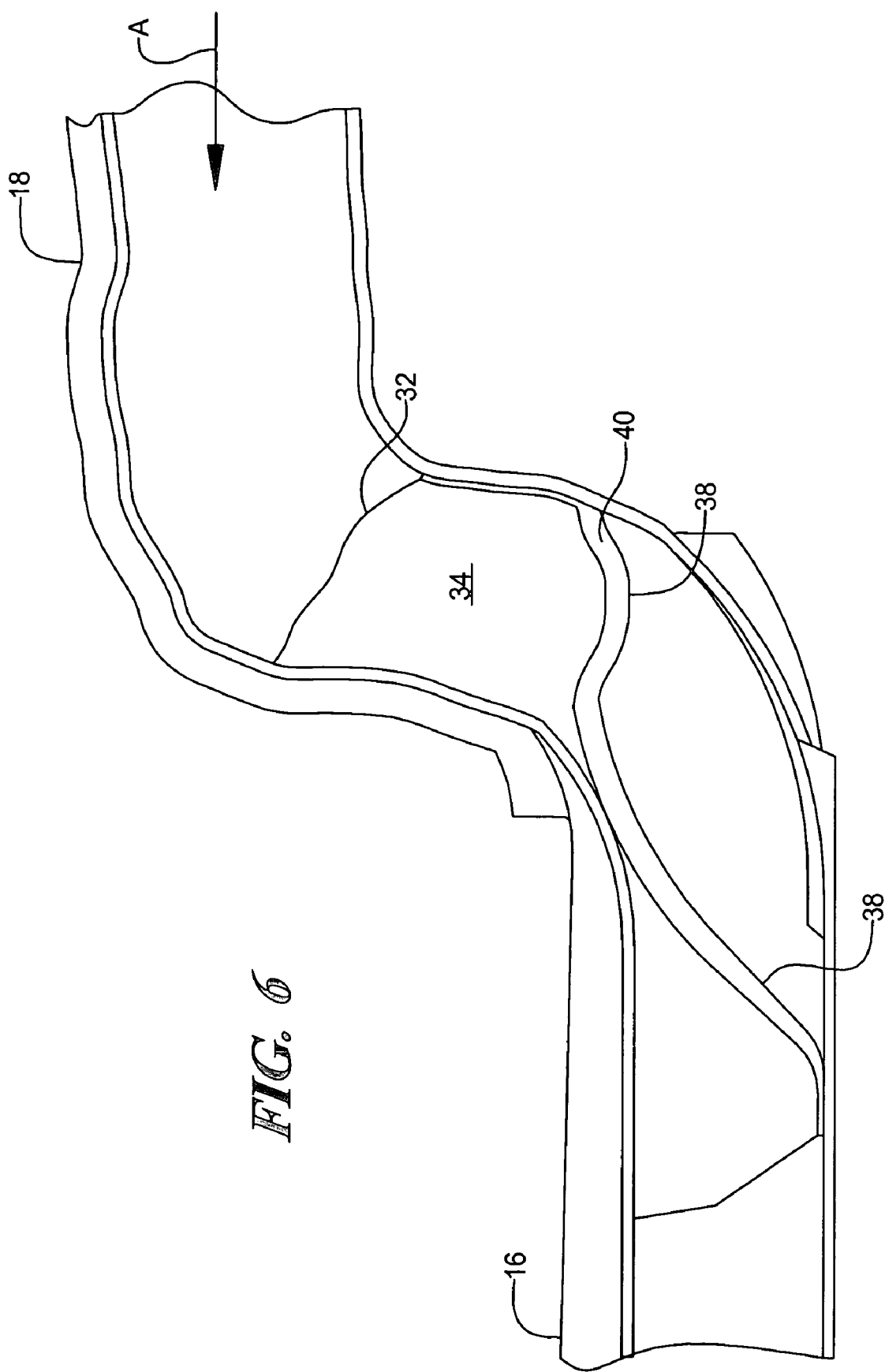
FIG. 6 is a front elevational view of the rail assembly of FIG. 1 illustrating an impact.

Referring to the drawings and in particular FIG. 1, one embodiment of a rail assembly 10, according to the present invention, is generally shown for a vehicle 12. The vehicle 10 includes a vehicle frame, generally indicated at 14. The vehicle frame 14 has at least one, preferably a pair of rails 16. The rails 16 are spaced laterally in parallel relationship with respect to each other and extend longitudinally forwardly and rearwardly, respectively. Each of the rails 16 has a forward portion 18, a central portion 20, and a rear portion 22. In one embodiment, the forward portion 18 includes a kick-down portion 23 having the rail assembly 10. The kick-down portion 23 transitions from a higher vertical height to a lower vertical height by a convex curved section transitioning to a concave curved section. It should be appreciated that, in another embodiment, the rear portion 22 may also include a kick-down portion with the rail assembly 10. It should also be appreciated that, except for the rail assembly 10, the vehicle 12 is conventional and known in the art.

Referring to FIGS. 1 through 5, the rail assembly 10 includes a rail member such as, for example, a hat member 24 including two lateral sides 26 extending longitudinally and a web 28 therebetween extending laterally and longitudinally. The web 28 and sides 26 define a generally U-shaped cross-section. The hat member 24 also includes marginal flanges 30 extending laterally and longitudinally from the sides 26 and generally parallel to the web 28 to form a generally inverted "hat" shaped configuration. The hat member 24 is made of a metal material. It should be appreciated that the hat member 24 is part of the rail 16 and forms the kick-down portion 23 of the forward portion 18 thereof.

The rail assembly 10 also includes a reinforcement or insert 32, according to the present invention, disposed within the hat member 24. The insert 32 includes two lateral sides 34 extending longitudinally and a web 36 therebetween extending laterally and longitudinally. The web 36 and sides 34 define a generally U-shaped cross-section. The insert 32 includes at least one, preferably a plurality of curved sections 38. The curved sections 38 are disposed on at least one of, preferably the sides 34 and web 36. The curved section 38 is generally convex shaped. The insert 32 includes at least one, preferably a plurality of ribs 40. The ribs 40 are disposed on at least one of, preferably the sides 34 and web 36. Each rib 40 extends inwardly from the interior of the side 34 and/or web 36. The ribs 40 have a generally arcuate cross-sectional shape. The insert 32 is made of a metal material. The insert 34 is a monolithic structure being integral, unitary, and one-piece. It should be appreciated that the curved sections 38 extend longitudinally along the web 36 to form a continuous curved section 38.

Referring to FIG. 2, the sides 34 and web 36 of the insert 32 are disposed in abutting relationship with the sides 26 and web 28 of the hat member 24. The sides 34 and web 36 of the insert 32 are fixedly secured to the sides 26 and web 28 of the hat member 24. More specifically, the sides 34 and web 36 of the insert 32 are spot welded to the sides 26 and web 28 of the hat member 24 at predetermined points along the longitudinal expanse thereof as illustrated in FIG. 2. It should be appreciated that the insert 32 may be used in any vehicle application having a unibody construction.

The structural assembly 10 further includes a second structural or closure member 42 closing the hat member 24. In one embodiment, the closure member 42 is planar and generally rectangular in shape. The closure member 42 extends laterally and longitudinally. The closure member 42 is disposed in abutting relationship with the flanges 30 of the hat member 24. The closure member 42 is secured to the hat member 24 by suitable means such as spot welding the closure member 42 to the flanges 30 of the hat member 24 at predetermined points along the longitudinal expanse thereof.

Referring now to FIG. 6, the vehicle 12 has experienced a collision, as indicted by the arrow A, resulting in damage to its front and specifically causing crush of the forward portion 18 of the vehicle frame 14. However, due in part to the rail assembly 10 of the forward portion 18 of the rail 16, the forward portion 18 of the rail 16 will deform in a predetermined accordion-like manner. As a result, more energy is absorbed by the forward portion 18 of the rail 16 of the vehicle frame 14, resulting in lower deceleration rates of the vehicle 12 and a greater dissipation of the energy of the collision.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

The invention claimed is:

1. A rail assembly for a vehicle comprising:
a rail member extending longitudinally and having a kick-down area; and
an insert disposed within and extending longitudinally along at least a portion of said kick-down area of said rail member and having a first longitudinal end contacting said rail member and a second longitudinal end contacting said rail member and having at least one curved section disposed between said first longitudinal end and said second longitudinal end and spaced from said rail member to provide load carrying capacity in said rail member, said insert being a monolithic structure that is integral, unitary, and one-piece.

2. A rail assembly as set forth in claim 1 wherein said insert has a generally convex shaped longitudinal cross-section.

3. A rail assembly as set forth in claim 1 wherein said insert has a pair of side walls extending longitudinally and a web extending between said side walls.

4. A rail assembly as set forth in claim 3 wherein said web has said at least one curved section.

5. A rail assembly as set forth in claim 3 including at least one rib extending inwardly from said side walls and said web.

6. A rail assembly as set forth in claim 1 wherein said rail member has a pair of side walls extending longitudinally, a web extending between said side walls, and marginal flanges extending from said side walls.

7. A rail assembly as set forth in claim 6 including a closure member secured to said flanges of said rail member.

8. A rail assembly as set forth in claim 7 wherein said closure member is a planar member.

9. A frame for a vehicle comprising:
a pair of rails extending longitudinally and having a forward portion and a rearward portion; and
at least one of said forward portion and said rearward portion having a kick-down area with a rail assembly comprising a rail member and an insert disposed within and extending longitudinally along at least a portion of said kick-down area of said rail member and having a first longitudinal end contacting said rail member and a second longitudinal end contacting said rail member and at least one curved section disposed between said first longitudinal end and said second longitudinal end and spaced from said rail member to provide load carrying capacity therein, said insert being a monolithic structure that is integral, unitary, and one-piece.

10. A frame as set forth in claim 9 wherein said insert has a generally convex shaped longitudinal cross-section.

11. A frame as set forth in claim 9 wherein said insert has a pair of side walls extending longitudinally and a web extending between said side walls.

12. A frame as set forth in claim 11 wherein said web has said at least one curved section.

13. A frame as set forth in claim 12 wherein one of said side walls and said web has at least one rib extending inwardly.

14. A frame as set forth in claim 10 wherein said rail member has a pair of side walls extending longitudinally, a web extending between said side walls, and marginal flanges extending from said side walls.

15. A frame as set forth in claim 14 including a closure member secured to said flanges of said rail member.

16. A vehicle comprising:
a pair of rails extending longitudinally and having a forward portion and a rearward portion; and
at least one of said forward portion and said rearward portion having a kick-down area with a rail assembly comprising a rail member and an insert disposed within and extending longitudinally along at least a portion of said kick-down area of said rail member and having a first longitudinal end contacting said rail member and a second longitudinal end contacting said rail member and having at least one curved section disposed between said first longitudinal end and said second longitudinal end and spaced from said rail member to provide load carrying capacity therein, said insert being a monolithic structure that is integral, unitary, and one-piece.

* * * * *